Jan. 29, 1929.
K. G. KARSTEN
1,700,318
TRIDIMENSIONAL CHART
Filed March 5, 1926
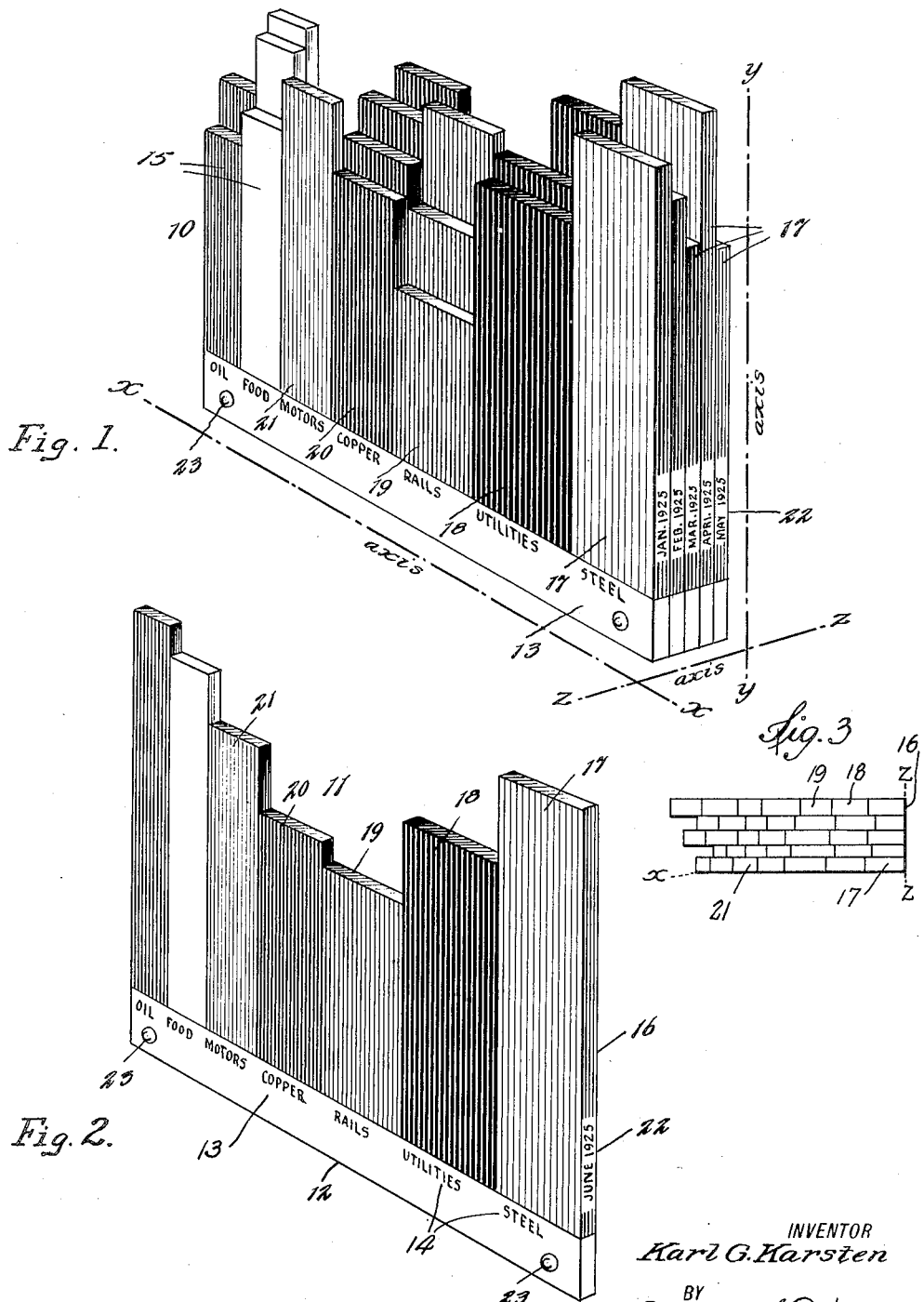
INVENTOR
Karl G. Karsten
BY
Warren S. Orton.
ATTORNEY Patented Jan. 29, 1929.

1,700,318

UNITED STATES PATENT OFFICE.

KARL G. KARSTEN, OF NEW HAVEN, CONNECTICUT.

TRIDIMENSIONAL CHART.

Application filed March 5, 1926. Serial No. 92,574.

The invention relates in general to a tridimensional chart for recording data in connection with some historical event and the invention relates specifically to such a chart fabricated from separate units added one after the other to the previously assembled similar units in accordance with same chronological or other sequential order.

In the form of the invention selected for specific illustration and description, the invention relates to an accumulative chart for recording certain factors of current events such as the transactions of a stock exchange and which vary in three or less factors to be recorded and in which the whole data is segregated into separate items and the variable factors of each item designated numerically by proportionate dimensions in designated parts of the whole chart.

The primary object of the invention is to provide a chart of some historical event which varies in two or more factors in succeeding intervals of time and which chart when viewed in different plans will give visual indications of certain information relative to the event.

Another object of the invention is to provide such a chart which will be cumulative and which may be added from time to time portions forming a continuation of the previously recorded data.

Accordingly the invention features the providing of a tri-dimensional chart made up of separate plates or book charts, one for each succeeding interval of time, provided with one or more distinctive bars or bands, each indicating by its width and height the numeral values of the historical factors which occurred during the interval of time covered by each particular bar chart.

In the accompanying drawing

Fig. 1 is a view in perspective of a solid chart constituting a preferred embodiment of the invention, and Fig. 2 is a bar chart constituting the next succeeding unit to be added to the fabricated chart shown on Fig. 1 and Fig. 3 is a plan view looking down on the assembly shown in Fig. 1.

There is shown in Figure 1 a solid tri-dimensional chart 10 fabricated from a plurality of similar plate 11 of the type shown in Fig. 2 so that the detailed description of Fig. 2 will be sufficient for any of the units which go to make up the assembly shown in Fig. 1.

The plate 11 includes a straight edge 12 constituting a base line and designed to rest with the plates vertically disposed on a flat support or otherwise assembled into a single plane when secured together with the plates back to back as shown in Fig. 1. The plate is provided at least on one face with a display space 13 on which are placed labels or other written information as shown at 14.

Above the display space is a record portion 15 constituting a bar chart formed of a plurality of vertically extending bars, in the instant case there being shown seven bars the first face of which is designated in order from the right edge 16, successively by reference characters 17 to 21 inclusive. Each bar is of a color distinct from the color of every other bar but it is obvious that where there are a large number of bars and a limited number of colors available, the colors may be duplicated, it being merely necessary that some usual distinction be made between the appearance of adjacent bars. Further, while the plates will be described in their more complicated form with a plurality of bars, it is equally within the scope of the disclosure to regard the record portion on each plate as constituting simply a single bar. In other words, two dimensional charts may be formed solely of the bars 17.

In the illustrated showing it is considered that the entire assembly shown in Fig. 1 represents certain data, such for instance as stock market sales over a plurality of intervals or periods of time, for instance, succeeding months, and that the separate and similarly colored bars relate to certain items of said data, such for instance, as the different classification of the stocks recorded. In this case bars 17 represent steel stocks; bars 18 indicate stocks known as utilities; bars 19 rails; bars 20 copper and bars 21 motors, and the last two "foods" and "oils", each as designated therebelow in the display space 13.

The component plates have a small uniform dimension in depth along the Z or time axis and the record portion of each bar is of varying lengths in its other two dimensions to represent certain factors of the data recorded. In the illustrated example, the vertical height or Y axis, indicate prices and the horizontal width or X axis indicate volumes of sales of each group represented. Referring to the bar chart shown in Fig. 2 which is the record for June 1925 as indicated at 22 on the marginal edge 16, the varying heights will indicate comparatively the prices high, low or average, at which the different classes of stocks sold during that month.

Similarly a comparison of the widths of the bars along the X axis will show the relative volumes of sales made in each class during that month.

In both cases some unit of measurement will be used in designing the bar for instance in one physical embodiment of the invention from which the drawing herein was made, each inch of height represents fifty ($50.00) dollars, and each inch of width represents a sale of one million (1,000,000) shares.

In order to facilitate tracing the movement of any one class or item of data where a plurality of classes or items are contained in one chart, as is the case in the device shown in Fig. 1, the similarly colored bands (17—21) are arranged in column and aligned as accurately as the variable widths of the bars will permit. This may be facilitated by grouping the bars of those stocks or classes which have the least variations in dimensions rear of each other and disposing the other classes to one of both sides thereof in the inverse order of their liability of probable variations in the factors recorded. In the illustrated showing the bars representing the steel stocks were disposed next adjacent the aligned edges 16 as this group was least liable to have its volume of sales differ in succeeding months. At the opposite edge of the plate 11 was positioned the "oils" which represent a class of stock quite liable to have extensive variations in volume of sales during succeeding months. In general this arrangement disposes the similar colored bars so that when looking down on the assembled chart there will be displayed in effect a bar chart showing the variations in amount of sales and at least in the case of the column formed by the bars 17 the edge opposite the edge 16 will form when viewed in plan a curve of sales for the steel stocks. Similarly when viewed in side elevation edgewise of the plates as seen at the upper right side of Fig. 1, there is shown a curve of prices of the miscellaneous stocks. By looking down at an angle on the other column of bars it will be seen that their upper edges likewise form a price curve for the stock group represented by the selected bars.

The record portions of each plate may represent other data; for instance, the area of each bar ($xy$) represents the amount of money involved in the transactions of this group for the time indicated; and the area obtained by multiplying total width times the average length of the bars represents the total amount of money involved in all the transactions for the month indicated.

Some suitable means such as a set of snap fasteners 23 are provided for securing each additional plate to the assembly in such way that the chart shown in Fig. 1 is a solid entity, and at the same time to provide for the ready withdrawal of any particular plate should it be desired to study or measure the same while separated from the other plates. The corresponding fasteners 25 on one side of each plate are spaced equal distances from the edge 16 so that the plates may be interchanged and at the same time insure the accurate locating of each column of bars in their proper predetermined position.

In operation it is intended that the charts herein described shall constitute a part of an information service in the form of the plates or bars distributed monthly or at other prescribed times to customers who will simply position each edition in engagement with the next preceding edition of the plates or bars and thus have available an accounted record of certain factors of past events.

In the instance illustrated the plates are prepared as soon as the figures of the factors to be recorded are available from the records of the preceding month and each bar is accurately proportioned to correspond with the record figures. For example, bar 17 in Fig. 2 is two inches high to represent an average price of 100 for miscellaneous stocks sold during June 1925, and this bar is one inch wide to represent that one million shares of miscellaneous stocks which were traded in during this month.

The fasteners are so located that the edges 16 will be in alignment thus establishing a time here or Z axis for the completed chart shown in Fig. 1. The plate 11 for June 1925 is moved flatwise into engagement with the back side of the last plate in the stack, being for May 1925, the properly located fasteners insuring the proper locating of the similar colored bars in their column formation hereinbefore described.

Having thus described my invention, I claim:

1. A tri-dimensional chart for recording the translations of a stock market or like sequences of historical events, said chart comprising a plurality of bar charts representing succeeding time intervals and arranged back to back in chronological order each bar chart having a number of bars thereon, each bar having a color distinct from the color of every other bar, the colors of each bar chart being arranged in the same order from one edge of the bar charts and the bars of similar colors arranged substantially in column, the bar of each color representing a factor of the data recorded, and each bar having a width compared to the width of every other part proportionate to the numerical value of a factor in the event indicated thereby and the length of each bar being proportionate to the numeral value of another factor in the event recorded by the chart.

2. A tri-dimensional chart for recording data in connection with stock market sales, said chart comprising a plurality of thin bar charts, each recording by two of its dimensions the sales price and volume of sales made during an interval of time, and said bar charts adapted to be assembled in the line of their least dimension in chronological order to form in one plane a curve of price changes and in another plane a curve of the volume of sales made during the time covered by the chart.

3. In a tri-dimensional chart, a unit thereof constituting a bar chart with the bars each representing an item of the data recorded by the chart and each bar being in a color distinct from the color of the next adjacent bar or bars, said bars each representing by its width the numerical value of one factor of the data and by its length a different factor of the data whereby there is presented a convenient means for visually comparing the numerical values of similar factors of the data recorded by the chart.

4. A tri-dimensional chart comprising a series of bands disposed in order one beside the other in one horizontal dimension, each band representing an item of the data recorded by the chart and each band having a color distinct from the color of every other band, the width of each band in said horizontal dimension having a numerical value proportionate to the factor represented by said dimension and the vertical dimension of each band being similarly proportionate to another factor of the data recorded by the chart.

5. A tri-dimension chart comprising a plurality of similar plates, each plate constituting a bar chart recording events in succeeding time intervals the upper edges of the chart considered in the smallest dimension of the plates constituting a curve of values recorded in connection with said events for said succeeding time intervals.

6. A tri-dimensional chart having a flat bottom and comprising units representing succeeding time intervals, the upper side of said chart in one horizontal direction forming a curve and each unit in the other horizontal direction constituting a bar chart representing by its length and width two factors of the data recorded by the chart for the time interval indicated by the unit.

7. A tri-dimension chart comprising a plurality of separable units each representing by certain of its dimensions the numerical values of factors of the data recorded and said units assembled to form the chart as a single entity.

8. A tri-dimensional chart comprising a plurality of separable units each representing by certain of its dimensions the numerical values of factors of the data recorded and said units assembled to form the chart as a single entity, and fastening means for securing the units to each other in order to form the chart.

9. A tri-dimensional chart comprising a plurality of separable units each representing by certain of its dimensions the numerical values of factors of the data recorded and said units assembled to form the chart as a single entity, fastening means for securing the units to each other in order to form the chart, and said fastening means defining the relative arrangement of the units in the chart.

10. A tri-dimensional chart comprising separable plates each provided with a chart and said plates assembled to form the tri-dimensional chart.

Signed at New York, in the county of New York and State of New York, this 3rd day of March, A. D. 1926.

KARL G. KARSTEN.